Feb. 14, 1939.　　　　C. C. FARMER　　　　2,147,296
ELECTROPNEUMATIC BRAKE
Filed Feb. 20, 1934　　　5 Sheets-Sheet 1
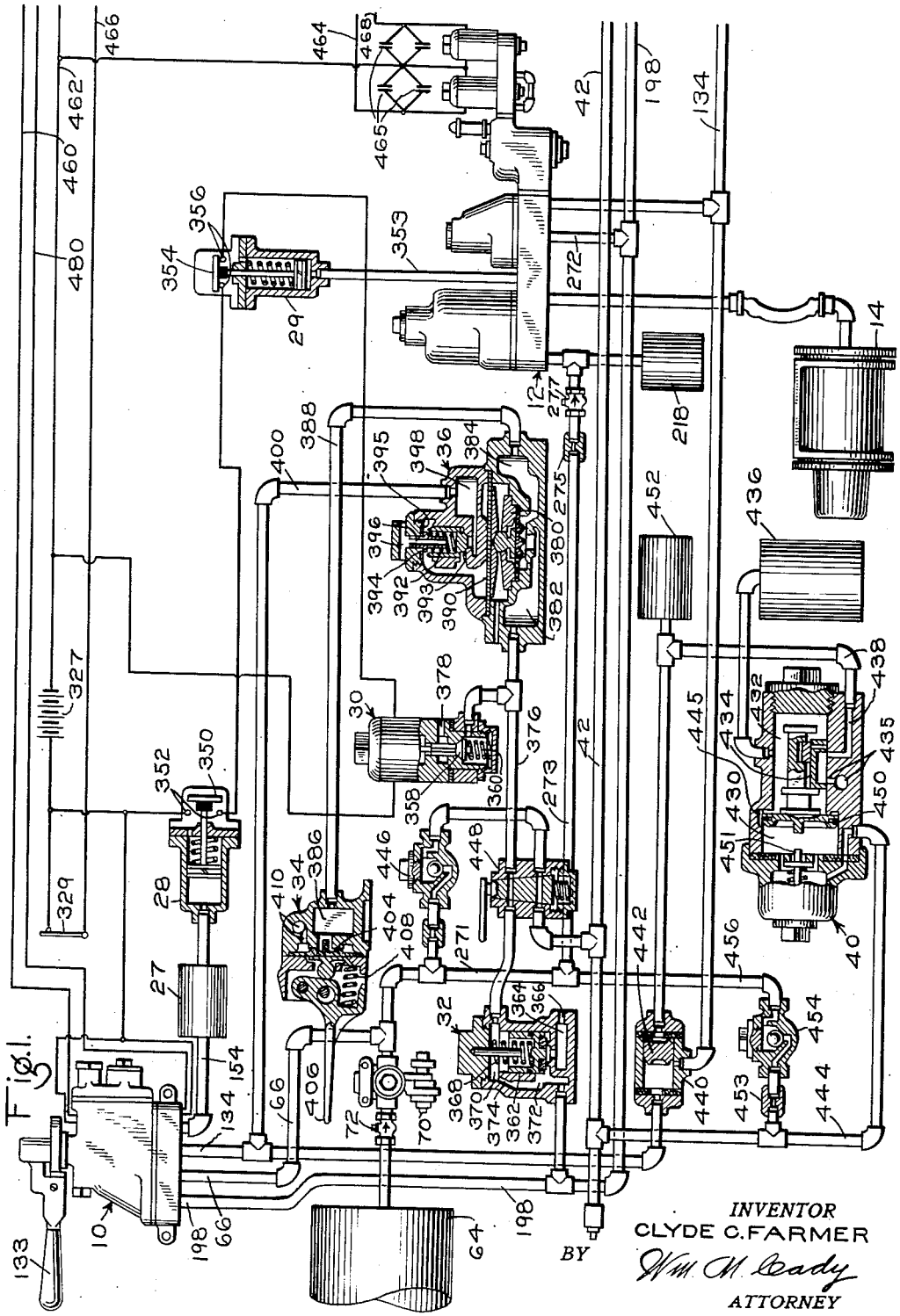
INVENTOR
CLYDE C. FARMER
BY
W. M. Cady
ATTORNEY

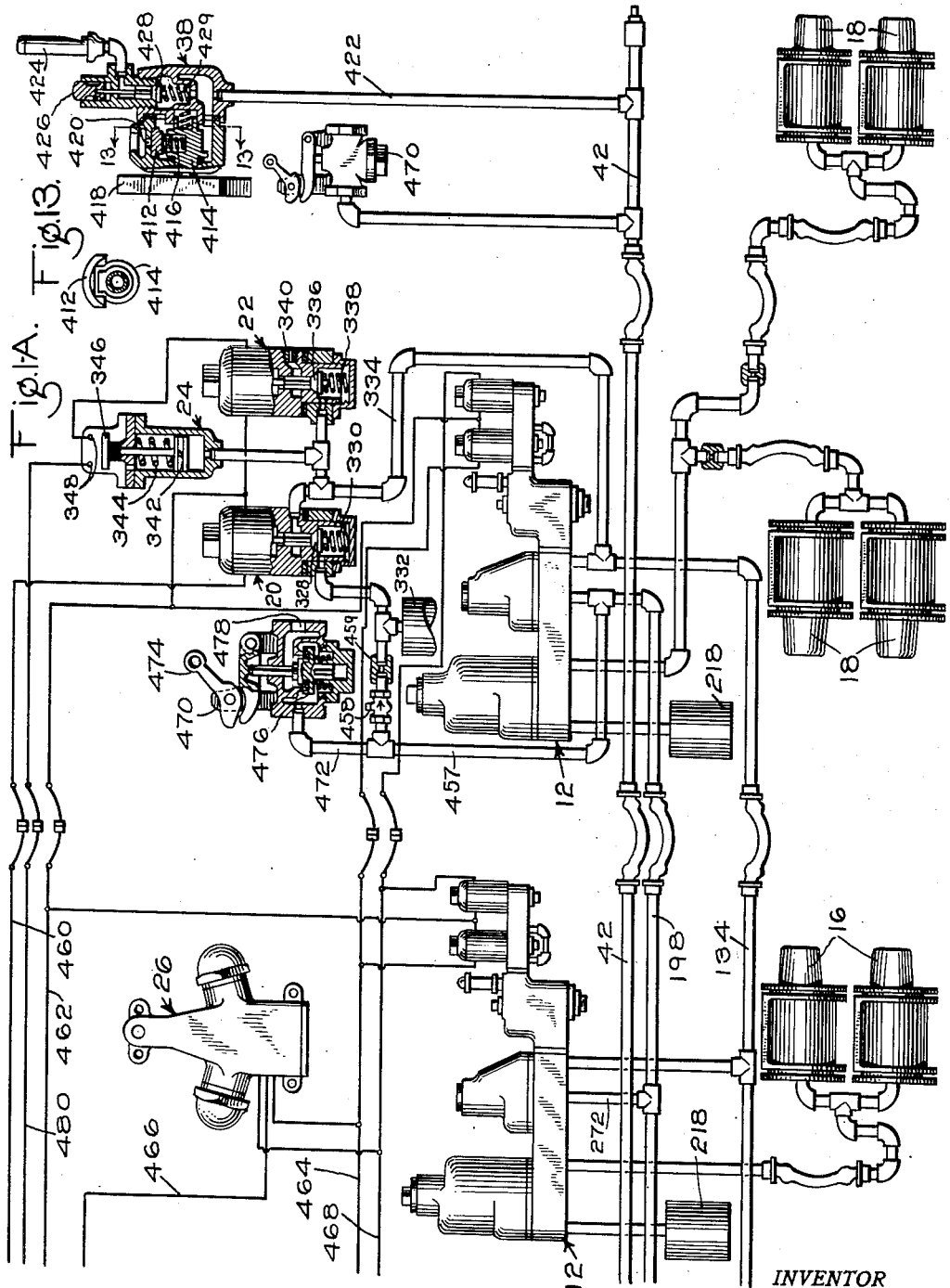

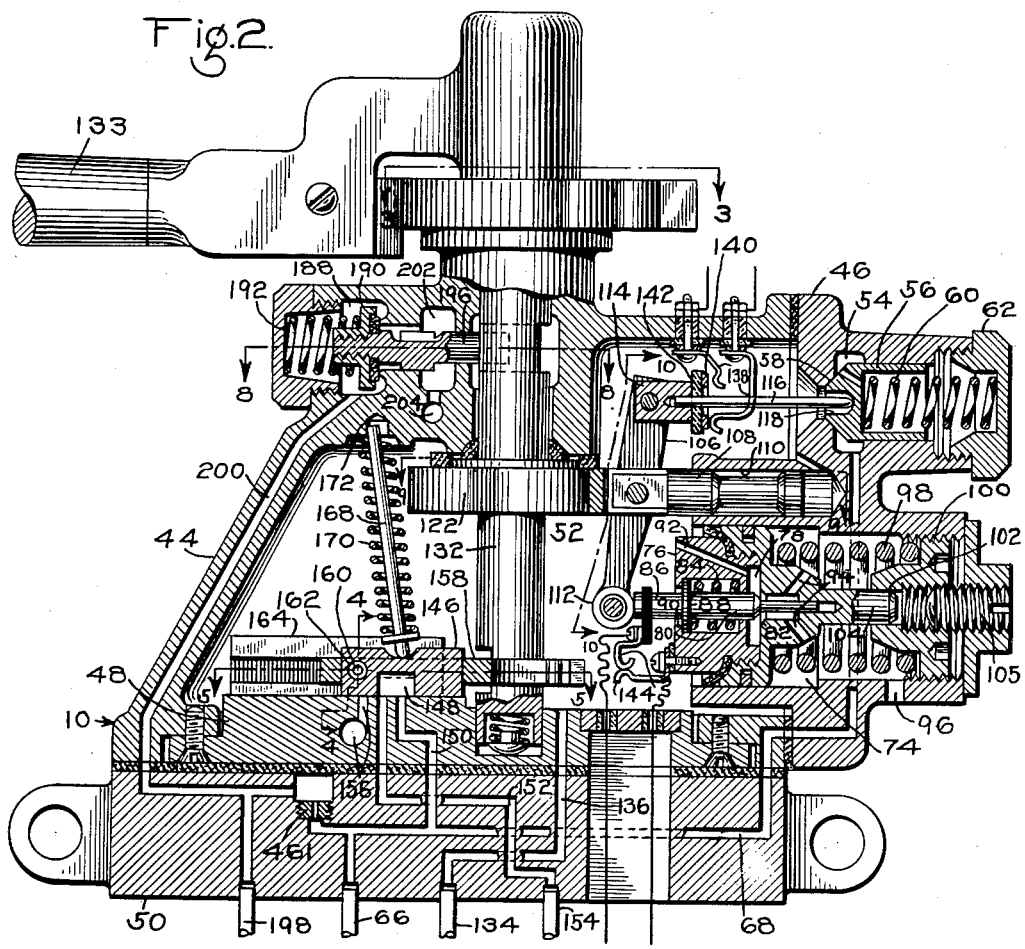
Fig. 2.
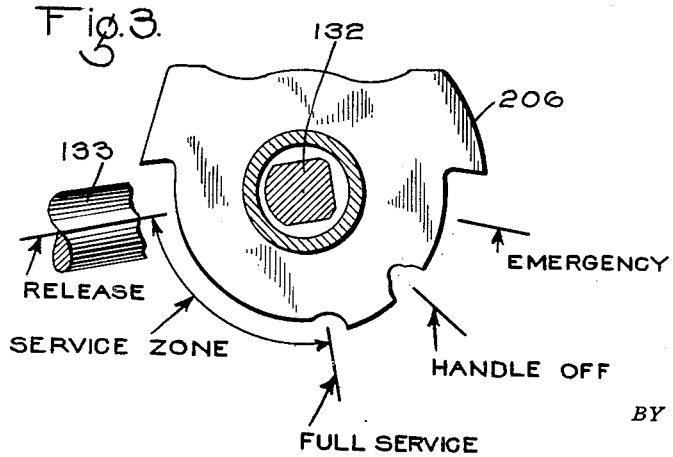
Fig. 3.
Fig. 4.

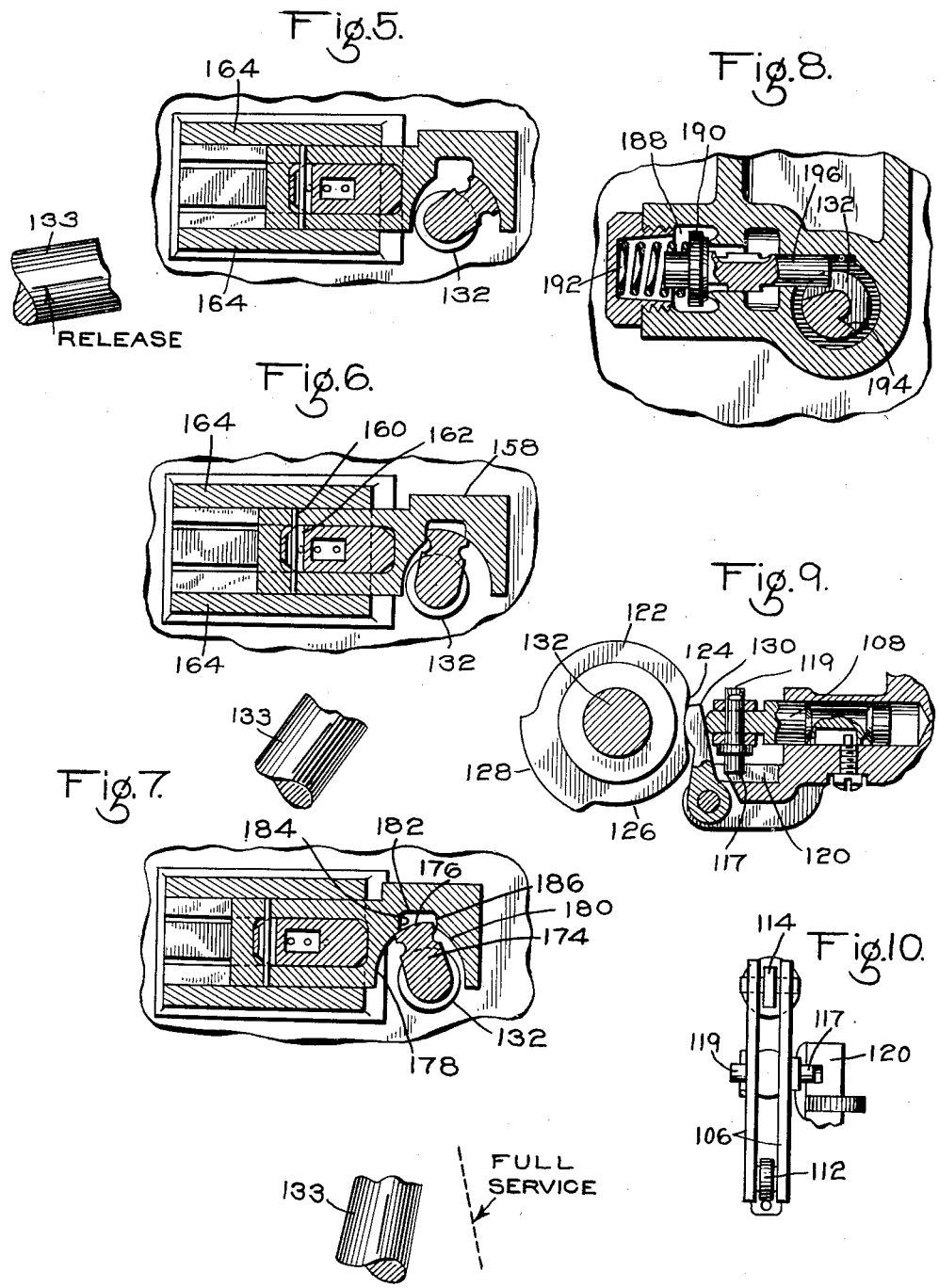

Feb. 14, 1939.    C. C. FARMER    2,147,296
ELECTROPNEUMATIC BRAKE
Filed Feb. 20, 1934    5 Sheets-Sheet 5
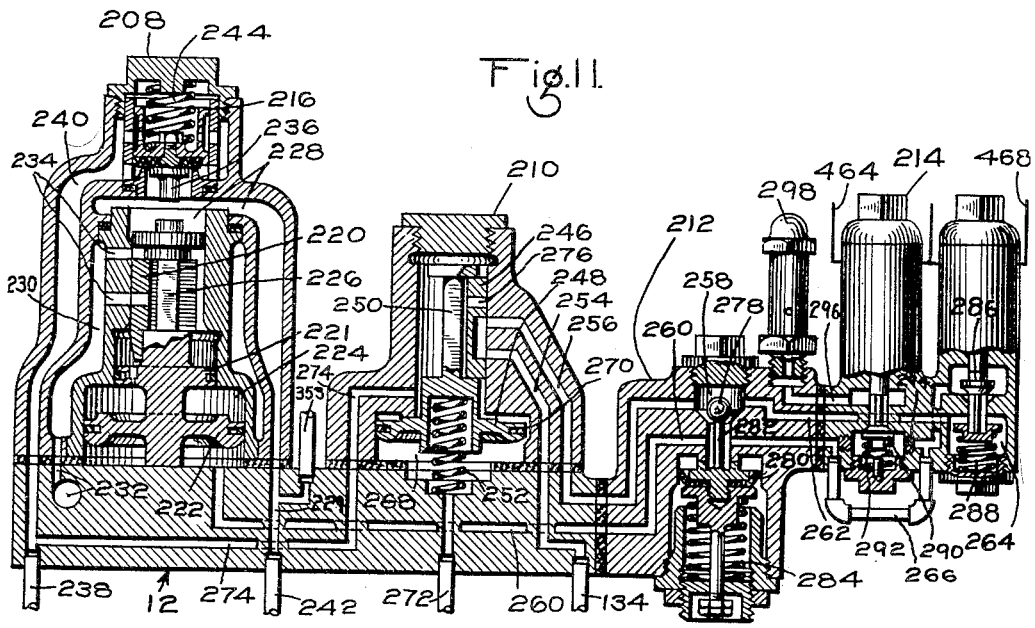
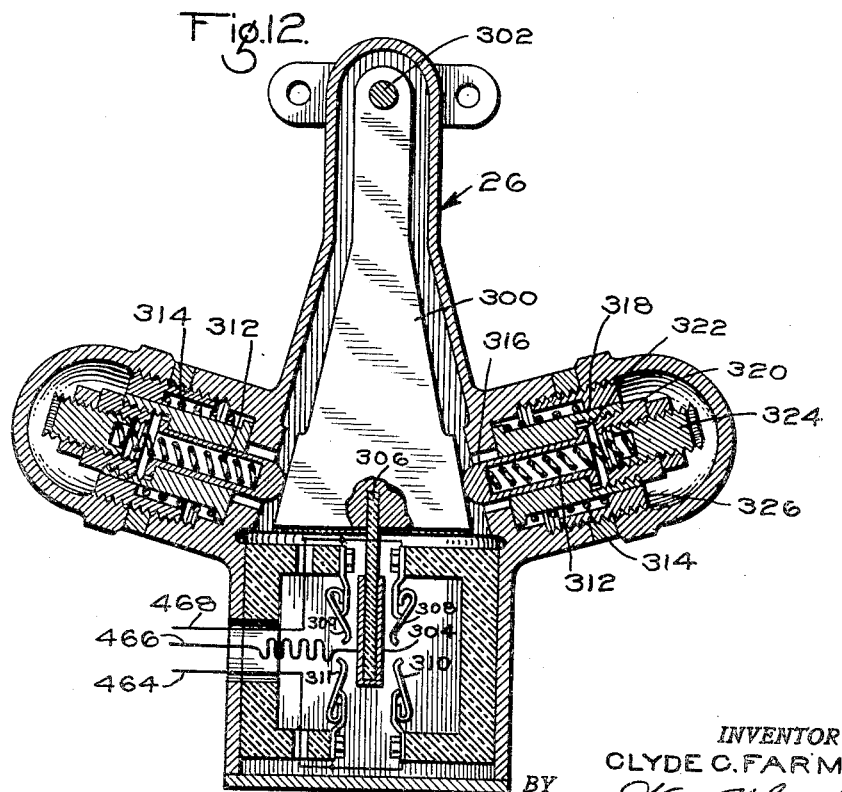
INVENTOR
CLYDE C. FARMER
BY *Wm. M. Cady*
ATTORNEY Patented Feb. 14, 1939

2,147,296

UNITED STATES PATENT OFFICE 2,147,296

ELECTROPNEUMATIC BRAKE

Clyde C. Farmer, Pittsburgh, Pa., assignor to The Westinghouse Air Brake Company, Wilmerding, Pa., a corporation of Pennsylvania Application February 20, 1934, Serial No. 712,153

50 Claims. (Cl. 303—15)

This invention relates to electro-pneumatic brakes, and in particular to electro-pneumatic brakes for traction vehicles and railway trains.

In the operation of high speed traction vehicles and railway trains, it is highly desirable that the operator be able to effect both a fast application and a fast release of the brakes, so that a high degree of flexibility will be afforded in the handling of the train. It is, therefore, a principal object of my invention to provide an electro-pneumatic brake apparatus in which both application and release of the brakes may be effected with great rapidity, so that high speed trains may be brought to a stop in a minimum length of time.

If when the brake valve handle is moved to service application position the apparatus should fail to respond to effect a service application of the brakes, some means should be provided for automatically effecting an emergency application of the brakes, because otherwise a stop may not be made in the desired length of time, or at the exact desired point. It is, therefore, another object of my invention to provide an electro-pneumatic brake equipment in which upon failure of the equipment to respond in a predetermined interval of time to effect a service application of the brakes upon movement of the brake valve handle to service application position, then the equipment acts automatically to effect an emergency application of the brakes.

A further object of my invention is to provide an electro-pneumatic brake equipment for braking high speed vehicles and trains, in which the rate of retardation due to application of the brakes may be limited to a predetermined value which will prevent wheel sliding.

A yet further object is to provide an equipment of this character in which the brakes may be operated from a towing vehicle, or from a control car or locomotive when vehicles so equipped are hauled "dead" as part of another train.

Still another object of my invention is to provide an electro-pneumatic brake equipment having control means for applying the brakes from the rear end of a vehicle or train during backing up movement.

A still further object of my invention is to provide a novel arrangement of and the utilization of specific apparatus, which in its entirety provides for light weight and low cost of complete equipment, as compared to air brake equipments now in general use for the same purpose.

Yet other objects and advantages of my invention will be apparent from the following description of one embodiment of it, which I have illustrated in detail in the attached drawings, wherein, Figs. 1 and 1—A, taken together, show a schematic arrangement of this embodiment as adapted to an articulated type of railway train comprising three vehicular units.

Fig. 2 is a diagrammatic sectional view of the brake valve device shown in Fig. 1.

Fig. 3 is a plan view along the line 3—3 of Fig. 2.

Fig. 4 is a sectional view along the line 4—4 of Fig. 2.

Fig. 5 is a sectional view along the line 5—5 of Fig. 2, showing the slide valve of the brake valve device in release position.

Fig. 6 is a view similar to that shown in Fig. 5, showing the slide valve just before movement to operating position.

Fig. 7 is a view similar to that shown in Fig. 5, with the slide valve moved to operating position.

Fig. 8 is a view along the line 8—8 of Fig. 2.

Fig. 9 is a view along the line 9—9 of Fig. 2.

Fig. 10 is a view along the line 10—10 of Fig. 2.

Fig. 11 is a diagrammatic sectional view of one of the control valve devices shown in both Figs. 1 and 1—A.

Fig. 12 is a diagrammatic sectional view of the retardation controller device shown in Fig. 1—A.

Fig. 13 is a view along the line 13—13 of the backing up valve and whistle device shown in Fig. 1—A.

As before stated, the embodiment shown is intended for a three-unit articulated type of railway train. In this type of train one truck serves to support the adjacent ends of two vehicle units. There are then required only four trucks for the three units in the train. In the embodiment shown it is assumed that the trucks common to two cars each have two axles, and that the endmost trucks at the extreme front and rear ends of the train also have two axles. There is then provided one brake cylinder for each axle throughout the train, except for the two front axles, and for these axles there is provided one brake cylinder, which is larger than those used for the other axles.

The distribution of the apparatus making up the equipment may be observed from the arrangement shown in Fig. 1 and Fig. 1—A. The dividing line between vehicle units in the train is shown by the hose connecting the pipe extending throughout the train. As will more fully hereinafter appear, the bulk of the apparatus in the equipment may be located on the head end or control car, and a smaller portion may be located on the second car. The third or last car carries only a very small portion of the equipment.

Considering the apparatus comprising the equipment briefly at first, in the embodiment shown I have, for effecting and controlling both service and emergency applications of the brakes, provided a brake valve device 10 and a plurality of control valve devices 12. As will be seen, two of the control valve devices are located on the head end or control car, while the third control valve device is located on the second car. One control valve device on the head end car controls the supply of fluid under pressure to the one large brake cylinder 14, while the other control valve device on the head end car controls the supply of fluid under pressure to the two brake cylinders 16. The third control valve device, on the second car, controls the supply to the four brake cylinders 18.

For effecting fast application and fast release of the brakes at the rear end of the train, I have provided a supply magnet valve device 20, a release magnet valve device 22, and a pneumatic switch device 24.

In order to limit the rate of retardation produced by application of the brakes, I have provided a retardation controller device 26.

For effecting an emergency application of the brakes upon failure of the equipment to respond to movement of the brake valve device handle to service application position, I have provided a timing reservoir 27, pneumatic switch devices 28 and 29, magnet valve device 30, and application valve device 32.

In order to incorporate the usual "deadman" feature in my invention, I have provided a foot valve device 34 and a cut-off valve device 36, which operate in conjunction with the aforementioned application valve device 32.

To permit the brakes to be applied from the rear of the train, and to give warning, when backing up, I have provided a backing up valve and whistle device 38.

In order that the brakes on the articulated train may be applied from a towing vehicle, or from another point, when the articulated train is being hauled as a "dead" part of another train, I have provided a triple valve device 40 and a brake pipe 42.

Considering now more in detail the apparatus enumerated above, the brake valve device 10 comprises a main casing section 44, a brake valve section 46, a lower section 48, and a pipe bracket section 50. These sections assembled together define a pressure chamber 52.

The brake valve section 46 is provided for effecting usual service applications of the brakes, and to also effect emergency pressure in the brake cylinders during an emergency application of the brakes.

This section is provided with a chamber 54 in which is disposed a supply valve 56, which is urged toward a seat 58 by a spring 60. Tension of the spring 60 is regulated by an adjusting nut 62.

The chamber 54 is connected to a main reservoir 64 by pipe 66 and passage 68, through a feed valve device 70 and a check valve device 72. The supply valve 56, therefore, controls the flow of fluid under pressure from the main reservoir 64 to the pressure chamber 52 in the brake valve device.

The brake valve section 46 is also provided with a chamber 74 in which is operatively mounted a movable abutment 76 in the form of a piston, which contains interiorly thereof a chamber 78.

Disposed in the chamber 78 is a release valve 80, which is urged away from a seat 82 by a spring 84. The valve 80 has an extended stem 86 provided with an annular shoulder 88 for engaging a flange 90 on the movable abutment, for limiting the travel of the valve 80 to the left.

The chamber 78 connects with the chamber 52 by way of a passage 92, and the release valve 80 therefore controls the release of fluid pressure from the pressure chamber 52 to the atmosphere by way of passage 92, chamber 78, passages 94, the portion of chamber 74 to the right of the movable abutment 76, and port 96.

The movable abutment 76 is subject on one side to the pressure in pressure chamber 52 and on the other side to the pressure of regulating spring 98. Tension of the spring 98 is regulated by a regulating member 100, which has a bore 102 therein for receiving a plunger portion 104 integral with the movable abutment. An adjusting screw 105 is provided for regulating movement of the movable abutment to the right.

For operating the supply valve 56 and the release valve 80, there is provided a mechanism including spaced levers 106 carried by a floating pivot carrier 108 slidably interfitting with a bore 110 in the brake valve section casing. Rotatably disposed between the lower ends of the spaced levers 106 is a roller 112, adapted to engage the end of the valve stem 86 associated with the release valve 80.

Loosely held between the upper ends of the spaced levers 106, is a member 114 carrying a rod 116 having one end thereof disposed in a recess 118 in the supply valve 56.

The spaced levers 106 are intended to effect an unseating of the supply valve 56 and a seating of the release valve 80, as will hereinafter more fully appear. In order to hold the ends of these levers in alignment with the supply and release valves, the levers are secured to the floating pivot carrier 108 by a pin 119 having an extension 117 movable in a slotway between lugs 120 carried by the casing of the brake valve section 46.

For actuating the floating pivot carrier 108 to cause unseating of the supply valve 56 and seating of the release valve 80, there is provided a cam 122 having a low portion 124, an intermediate portion 126 and a high portion 128. Spaced between the cam 122 and the outermost end of the floating pivot carrier 108 is a freely moving lever 130. The cam 122 is secured to and rotatable with an operating shaft 132, which is adapted to be rotated by a brake valve handle 133.

When the handle 133 is moved in a counterclockwise direction, as viewed in Figure 3, the cam 122 actuates the floating pivot carrier 108 to the right, as viewed in Figure 2. Movement of the floating pivot carrier 108 to the right carries with it the spaced levers 106, the lower end of which acts to seat the release valve 80 against opposition of the spring 84, which is a relatively light spring.

When the release valve 80 is seated the upper ends of the spaced lever 106 actuate the rod 116 to unseat the supply valve 56 against opposition of the spring 60, which is to be understood as offering a greater resistance than the light spring 84. During this movement of the floating pivot carrier, the regulating spring 98, which opposes movement of the movable abutment 76, is unappreciably compressed, as it is of considerably higher resistance than either of the springs 60 or 84.

The pressure chamber 52 is in constant communication with a straight air pipe 134 by a passage 136, and as will hereinafter more fully appear, the brake valve section 46 operates to control the supply of fluid under pressure to and its release from the straight air pipe 134.

For the purpose of providing for operation of the magnet valve device 20 at the rear end of the train, there are provided resilient contacts 138 secured to and insulated from the main casing section 44, as shown in Figure 2. These contacts are adapted to be bridged by a contact element 140 carried on an insulating member 142 secured to the member 114 between the upper ends of the spaced levers 106.

When the floating pivot carrier 108 is actuated to the right to cause the rod 116 to unseat the supply valve 56, the contact element 140 bridges the two contacts 138 to cause energization of the application magnet valve device 20, as will hereinafter more fully appear.

For operating the magnet valve device 22 at the rear end of the train, there are provided contacts 144, one of which is secured to and insulated from the movable abutment 76, while the other is secured to and insulated from the extension 86 of the valve stem associated with the release valve 80.

When the release valve 80 is in unseated position, the contacts 144 are in engagement with each other, and when the release valve is in seated position the contacts are out of engagement with each other. As will hereinafter more fully appear, when the contacts are in engagement with each other the release magnet valve device 22 may be energized thereby, and when the contacts are out of engagement with each other the release magnet valve device 22 is deenergized.

Operatively mounted upon the inner face of the lower section 48 is a slide valve 146, for controlling the supply of fluid under pressure to and its release from the timing reservoir 27. The slide valve is provided with a cavity 148, which for one position of the slide valve connects a passage 150 leading to the main reservoir 64 with a passage 152 leading to the timing reservoir 27 by way of pipe 154; and for another position of the slide valve the cavity 148 connects the passage 152 leading to the timing reservoir with a port and passage 156 leading to the atmosphere.

For operating the slide valve 146, there is provided a yoke member 158, which is apertured to receive the slide valve. A pin 160, having its ends secured in the yoke 158, passes through an oversize aperture 162 in the slide valve, for the purpose of retaining the slide valve in the apertured portion of the yoke member, but providing for limited freedom of movement of the slide valve vertically.

For the purpose of providing for lateral movement of the slide valve when the yoke member is moved, there are provided guiding elements 164 on either side of the yoke member 158 having slots therein for receiving the sides of the yoke member, and adapted to permit the yoke member to be slid laterally therein.

For holding the slide valve 146 upon its seat, there is provided a rod 168 upon which is concentrically disposed a spring 170. One end of the rod 168 bears upon the slide valve under tension of the spring 170, while the other end of the pin loosely fits into a recess 172 in the main casing section 44.

For actuating the yoke 158 to move the slide valve back and forth, there is provided a lug member 174 secured to the aforementioned shaft 132. The lug member 174 is provided with a head portion 176 adapted to move contiguously of arcuate faces 178 and 180 in a head portion of the yoke member 158. The arcuate faces 178 and 180 are eccentric to each other and the adjacent edges thereof terminate in a slot 182 having shoulders 184 and 186.

When the shaft 132 is rotated the head portion 176 of the lug 174 will move in contacting relation with the arcuate faces 178 and 180. When the brake valve handle 133 is in release position, the head portion 176 is contiguous to the arcuate face 180 and slide valve 146 is positioned to connect timing reservoir passage 152 with main reservoir passage 150.

When the brake valve handle 133 is moved to application position, the head portion 176 engages the shoulder 184, as shown in Fig. 6, to position the slide valve to connect timing reservoir passage 152 with port and passage 156 leading to the atmosphere.

When the brake valve handle is moved back to release position, the head portion 176 engages the shoulder 186, as shown in Fig. 7, to move the slide valve back to release position.

For effecting emergency applications of the brakes the main casing section 44 of the brake valve device is provided with a valve chamber 188, in which is disposed an emergency valve 190. The valve 190 is held seated by a spring 192 and is urged to unseated position by engagement of a face 194 of a slot cut in the aforementioned operating shaft 132 with a stem 196 associated with the emergency valve 190.

The chamber 188 is in communication with an emergency pipe 198 by way of a passage 200, and as will hereinafter more fully appear, unseating of the valve 190 by engagement of the slot face 194 with the valve stem 196 will vent the emergency pipe 198 to the atmosphere by way of chamber 202 and exhaust passage 204.

At the top of the brake valve device 10 there is provided the usual notched plate 206, having notches and stops for indicating to the operator certain positions of the brake valve handle 133, as is more clearly shown in Fig. 3.

Each control valve device 12 comprises a relay valve section 208, an emergency valve section 210, an inshot valve section 212, and a magnet valve section 214.

The relay valve section 208 is provided with a poppet type valve 216 for controlling the supply of fluid under pressure from a connected supply reservoir 218 to the connected brake cylinder or brake cylinders. The relay valve device is also provided with a slide valve 220 for controlling the release of fluid pressure from the connected brake cylinder or brake cylinders to the atmosphere.

For operating the slide valve 220 and the poppet valve 216, there is provided a piston 222 operatively mounted in a piston chamber 224. The piston 222 has connected therewith a rod 226, for operating the slide valve 220 and the poppet valve 216. When the piston 222 is in its lowermost position, the slide valve connects chamber 228, leading to the brake cylinder or brake cylinders by way of passage 229 and pipe 242, with chamber 230, leading to the atmosphere by way of port and passage 232, through ports 234.

When the piston 222 is in its uppermost position, the slide valve blanks off ports 234 to disconnect the chamber 228, leading to the brake cylinders, from the atmosphere, and the rod 226, connected to the piston, engages valve stem 236, connected to the poppet valve 216, to unseat the poppet valve to permit fluid under pressure to flow from the connected supply reservoir 218 through pipe 238, chamber 240, past the unseated poppet valve 216, to the chamber 228, and from thence to the connected brake cylinder or brake cylinders by way of passage 229 and pipe 242.

When the piston 222 is in its lowermost position the valve 216 is held in seated position by spring 244.

The emergency valve section 210 is provided with a slide valve 246, which is adapted to control the supply of fluid under pressure supplied to the piston chamber 224, in the relay valve section, to operate the piston 222. For operating the emergency slide valve 246 there is provided a piston 248, having a rod 250 integral therewith adapted to move the slide valve 246 when the piston is moved.

The piston 248 is urged to its uppermost position by a spring 252, and in this position the slide valve 246 connects the straight air pipe 134 from the brake valve device 10 with the piston chamber 224 in the relay valve section, by way of passages 254 and 256, chamber 258 in the inshot valve section 212, and passage 260 leading to the piston chamber 224 beneath the piston 222. A by-pass around the inshot valve is provided through the magnet valve section 214, by way of passage 262, chamber 264, and pipe 266.

The emergency piston 248 is disposed in a chamber 268 provided with a feed groove 270, so that when the emergency piston 248 is in its uppermost position, fluid under pressure may be supplied to the connected supply reservoir 218 from a branch pipe 272 through the feed groove 270 and passage 274. The frontmost supply reservoir may also be recharged from the main reservoir 64 through pipes 271 and 273, choke plug 275, and ball check valve 277.

When an emergency application of the brakes is effected, the pressure in the emergency pipe 198 is reduced at a fast rate, whereupon the pressure on the upper side of the emergency piston 248 overbalances that on the underside, and the emergency piston is thus caused to move to its lowermost position. In this position the slide valve 246 disconnects passage 254 from passage 256, and connects passage 256 directly to the supply reservoir 218, through port 276 in the slide valve 246, and passage 274, so that fluid is supplied to the piston chamber 224 in the relay valve section, beneath the piston 222, directly from the supply reservoir instead of from the straight air pipe 134.

The inshot valve section 212 functions to insure a supply of, and to control the rate of flow of, fluid under pressure to the piston chamber 224 in the relay valve section. The inshot valve section is provided with the aforementioned chamber 258 in which is disposed a ball valve 278, operated by a piston 280 through a stem 282.

The ball valve 278 is held in unseated position by a spring 284 acting upon the piston 280. When fluid under pressure flows from the straight air pipe 134, or from the supply reservoir 218, to the relay piston chamber 224, the initial rate of flow is high. When the pressure in the relay chamber 224 has reached a predetermined value, the inshot piston 280 is moved downwardly to seat the ball valve 278, and thereafter fluid must flow to the relay chamber 224 through the by-pass path, which includes the aforementioned passage 262, chamber 264, and pipe 266.

Flow through this by-pass path is controlled by an electro-magnetically operated supply valve 286, in the magnet valve section 214. The supply valve 286 is urged to unseated position by a spring 288, and to seated position by an electromagnet in the upper part of the magnet valve section 214, which when energized, as will hereinafter more fully appear, urges the valve to seated position.

Flow of fluid through the by-pass path may lead to the atmosphere, and is so controlled by a release valve 290, which is urged to a seated position by a spring 292, and to unseated position by an electromagnet in the upper part of the magnet valve section 214, which when energized, as will appear presently, actuates the valve to unseated position. A choke plug 294 controls the rate of flow to the atmosphere when the valve 290 is unseated.

When the valve 290 is unseated, the flow to the atmosphere is past the unseated valve, through passage 296 and safety valve device 298. The safety valve device 298 is preferably of the type usually employed in connection with fluid pressure brake apparatus, and, as is well known, functions to limit the pressure which may be released from the brake cylinders.

As will hereinafter more fully appear, operation of the supply valve 286 and the release valve 290 is controlled by the retardation controller device 26, to limit the rate of retardation produced by application of the brakes.

The retardation controller device 26 is preferably of the type described and claimed in the application of Clyde C. Farmer for a Railway vehicle control apparatus, filed January 23, 1934, Serial No. 707,918. In the embodiment shown in the present application, the retardation controller device comprises essentially a pendulum 300 adapted to swing about a pivot 302 and carrying a contact 304 insulated therefrom by an insulating member 306.

The contact 304 is adapted to engage, successively, contacts 308 and 310 when the pendulum 300 is swung to the right, and contacts 309 and 311 when the pendulum is swung to the left. Contacts 308 and 309 are preferably connected together, as are contacts 310 and 311, so that the retardation controller device will be effective for both directions of travel of the vehicle or train with which it is associated.

Movement of the pendulum 300 to the left or right is opposed by a light spring 312 for short movements and a heavy spring 314 for larger movements. The light spring 312 urges a plunger 316 into contact with the lower or weighted portion of the pendulum 300, while the heavy spring 314 acts upon an outer sleeve member 318. When the plunger 316 has compressed the light spring 312 an amount determined by the position of an adjustable stop 320 secured in the outer sleeve 318, a flange 322 on the plunger engages the adjustable stop 320 to move the outer sleeve 318 against opposition of the heavy spring 314.

Tension of the light spring 312 is adjusted by a screw 324, while tension of the heavy spring is similarly adjusted by an adjusting member 326.

The pendulum 300 is adapted to be moved by force of inertia, as when the speed of the train changes due to application of the brakes. The force of inertia acting upon the pendulum is proportional to the rate of speed change, therefore, one rate of speed change will compress the light spring 312, while a greater rate of speed change will be required to compress the heavy spring 314.

It will, therefore, be obvious that the tension of the light and heavy springs may be adjusted so that a relatively low rate of speed change will compress the light spring 312, to cause engagement of the movable contact 304 with either of the stationary contacts 308 or 309, while a greater rate of speed change will be required to compress the heavy spring 314 to cause engagement of the movable contacts 304 with either of the stationary contacts 310 or 311.

The contacts 308 and 309 are connected to one terminal of the electromagnet in the magnet valve section 214, of the control valve device 12, operating the supply valve 286, while the contacts 310 and 311 are connected to the electromagnet operating the release valve 290. The movable contact 304 is connected to a suitable source of current supply, as for example a battery 327, through a switch 329. The other terminal of the electromagnet is connected to the opposite terminal of the battery 327, so that the electromagnets will be properly energized when the retardation controller operates.

The application magnet valve device 20 is provided with a valve 328, which is urged toward seated position by a spring 330 and to unseated position by an electromagnet in the upper part of the casing enclosing the valve device, which when energized acts to unseat the valve.

This application magnet valve device controls the flow of fluid from a volume reservoir 332 to the end of the straight air pipe 134 at the rear end of the train, through a pipe 334.

The release magnet valve device 22 is provided with a valve 336, which is urged to seated position by a spring 338 and to unseated position by an electromagnet in the upper part of the casing embodying the valve device, which when energized acts to unseat the valve.

This release magnet valve device operates to control the release of fluid pressure from the rear end of the straight air pipe 134 to the atmosphere, a choke plug 340 being provided in the magnet valve device to restrict the rate at which fluid flows to the atmosphere.

The pneumatic switch 24 is embodied in a casing defining a piston chamber containing a piston 342 which is urged downwardly by a spring 344. The piston 342 is adapted to operate a movable contact 346 into an out of engagement with stationary contacts 348, which are connected in the circuit leading to the release magnet valve device 22.

When fluid pressure is present in the straight air pipe 134, the piston 342 is actuated upwardly to cause the movable contact 346 to engage the stationary contacts 348. When fluid pressure is released to the atmosphere from the straight air pipe 134, the piston 342 will hold the movable contact 346 in engagement with the stationary contacts 348 until the pressure in the straight air pipe has fallen to a predetermined value, whereupon the piston 342 will be moved to its lowermost position by the spring 344 to disengage the movable contact 346 from the stationary contact 348, and thereby interrupt the circuit to and deenergize the electromagnet of the release magnet valve device 22. The pneumatic switch 24, therefore, prevents further release of fluid pressure from the straight air pipe by operation of the release magnet valve device 22, when the pressure in the straight air pipe has fallen to a predetermined value.

The pneumatic switch devices 28 and 29 are preferably similar to the pneumatic switch device 24. The pneumatic switch device 28 has its piston chamber connected to the timing reservoir 27, so that as long as the pressure in the timing reservoir is above a predetermined value, the switch device holds its movable contacts 350 out of engagement with its stationary contacts 352, for a purpose which will appear later.

The other switch device 29 has its piston chamber connected to the brake cylinder passage 229 in the control valve device 12 on the control car, by pipe 353, so that as long as the pressure in the brake cylinders is above a predetermined value this pneumatic switch will hold its movable contact 354 out of engagement with its stationary contacts 356.

The contacts of the two switch devices 28 and 29 are connected in a circuit leading to the magnet valve device 30, for controlling operation of this magnet valve device, as will hereinafter more fully appear.

The magnet valve device 30 is provided with a valve 358, which is urged toward seated position by a spring 360 and to unseated position by an electromagnet in the upper part of the casing embodying the valve device, which when energized operates to unseat the valve. The magnet valve device 30 is provided for controlling operation of the application valve device 32, as will hereinafter more fully appear.

The application valve device 32 is embodied in a casing having a valve 362, for controlling the flow of fluid from a chamber 372, and the emergency pipe 198, to a chamber 364 in the valve device leading to the atmosphere through a port 366.

The valve 362 is urged toward seated position by a spring 368. A chamber 370 above the valve 362 connects with the chamber 372, to which the emergency pipe 198 is connected, by an equalizing, restricted passage-way 374. The chamber 370 is connected to the valve chamber of the magnet valve device 30 by a pipe 376.

When the valve 358 in the magnet valve device is in unseated position, fluid pressure in the chamber 370 of the application valve device is released to the atmosphere through a port 378 in the magnet valve device. The pressure on the underside of the valve 362 then unseats the valve to permit fluid pressure in the emergency pipe 198 to be released to the atmosphere through port 366.

When the valve 358 in the magnet valve device is seated, fluid pressure builds up in the chamber 370 above the valve 362 from the emergency pipe 198, through the equalizing passageway 374, and the spring 368 seats the valve 362 to cut off further release of fluid pressure from the emergency pipe to the atmosphere.

The cut-off valve device 36 also controls operation of the application valve device 32. The cut-off valve device is embodied in a casing having a valve 380, which is adapted to control the flow of fluid from a chamber 382, connecting with the chamber 370 in the application valve device by the aforementioned pipe 376, and a chamber 384, connecting with a chamber 386 in the foot valve device 34 by a pipe 388.

The cut-off valve device is also provided with a diaphragm 390, which is adapted to cause the valve 380 to be seated when pressure above the diaphragm exceeds a predetermined value. Pressure above the diaphragm is controlled by a valve 392, which is urged toward a lower seat 393 by spring 394, and toward an upper seat 395 by pressure below the valve.

When the valve 392 is seated, in lower position the chamber above the diaphragm 390 is in communication with the atmosphere through a passage 396. Pressure to operate the diaphragm 390 is supplied from the straight air pipe 134 to a chamber 398, through pipe 400. When the pressure supplied to this chamber reaches a predetermined value, the valve 392 is actuated from its lower seat 393 to its upper seat 395, to cut off communication with the atmosphere and permit fluid to flow to the chamber above diaphragm 390. Fluid pressure from the straight air pipe, therefore, acts upon the diaphragm 390 to cause seating of the valve 380.

When the pressure above the diaphragm drops below a predetermined value, the valve 380 is unseated by the pressure in chamber 382, which may then flow to the chamber 384 and from thence to the chamber 386 in the foot valve device 34.

The foot valve device 34 comprises a casing provided with the aforementioned chamber 386, and a valve 404, which is held in seated position by pressure on a foot pedal 406. When pressure is released on the foot pedal 406, a spring 408 urges the foot pedal out of engagement with the valve 400, so that pressure in the chamber 386 may unseat the valve and fluid under pressure thus flows past the unseated valve to the atmosphere, by way of port and passage 410.

It will thus be obvious that so long as the pressure above the diaphragm 390 in the cut-off valve device is above a predetermined value, the valve 380 will be held seated and there will be no need for pressure on the foot pedal 406 of the foot valve device. However, when the pressure above the diaphragm, and consequently that in the straight air pipe, is below this predetermined value, pressure must be maintained on the foot pedal 406, otherwise the application valve device 32 will be caused to vent the emergency pipe to the atmosphere, and as will hereinafter appear, effect an emergency application of the brakes.

The backing up valve and whistle device 38 is embodied in a casing provided with a segmental valve 412 carried by a hub portion 414, and urged outwardly against a seat by a spring 416. The valve 412 is adapted to be rotated by a hand wheel 418.

In release position, the segmental valve 412 blanks a port 420 leading to the atmosphere. In application position, the segmental valve uncovers this port to release vent the brake pipe 42 to the atmosphere, by way of pipe 422 and port 420.

The back-up valve and whistle device is also provided with a whistle 424, which is adapted to be operated upon depressing a button 426, which unseats a whistle valve 428, against pressure of a seating spring 429, to permit fluid under pressure to flow from the brake pipe past the unseated whistle valve 428 to the whistle 424.

The triple valve device 40 may be of any of the usual types commonly employed, and as one example I have shown a plain type triple valve device. This device is embodied in a casing provided with a piston chamber 430 and a slide valve chamber 432.

Disposed in the slide valve chamber 432 is a slide valve 434, for controlling the flow of fluid from an auxiliary reservoir 436 to the straight air pipe 134, by way of the slide valve chamber 432, pipe and passage 438, and a double check valve device 440.

When fluid is supplied to the straight air pipe from the auxiliary reservoir 436, valve 442 in the double check valve device 440 is moved to the left to blank off the connection with the brake valve device 10. The slide valve 434 may then release fluid pressure from the straight air pipe extending throughout the train to the atmosphere, when the slide valve is in release position, through port and passage 435, as shown in Fig. 1.

The piston chamber 430 of the triple valve device is connected to the brake pipe 42 by a pipe 444. Pressure in the brake pipe 42 is maintained from the main reservoir 64 through a ball check valve 446, a double cock 448, and the feed valve device 70. The auxiliary reservoir 436 is charged from the main reservoir 64 through a feed groove 445 in the triple valve device in the usual manner.

The triple valve device is caused to actuate to application position in the usual manner, by a reduction in brake pipe pressure, as by operation of the back-up valve device 38, or by operation of the brake valve device on a towing vehicle. When the brake pipe pressure is thus reduced the triple valve piston 450 moves to application position to cause fluid under pressure to be supplied from the auxiliary reservoir 436 to the straight air pipe 134. When pressure is restored in the brake pipe, the triple valve piston operates in the usual manner to release fluid under pressure from the straight air pipe to the atmosphere.

When application of the brake is being controlled by the triple valve device, it is usually not desired that the brake cylinder pressures be as high as when controlled electro-pneumatically from the brake valve device 10. In order to limit the pressures established in the brake cylinders, a volume reservoir 452 has been provided in the line between the triple valve device and the straight air pipe.

When a train equipped with the embodiment shown is being hauled "dead", and the brake thereon operated from a brake valve device on a towing vehicle, the double cut-out cock 448 is moved to cut-out position, so that upon a reduction in brake pipe pressure main reservoir and emergency pipe pressure will not be released to the atmosphere.

When the double cut-out cock 448 is in cut-out position, the supply reservoirs 218 may be recharged from the brake pipe 42 through choke plug 453, ball check valve 454, pipe 456, the same as when charged from the main reservoir 64. Of course if the main reservoir 64 is available to recharge the supply reservoirs, recharging pressure from the brake pipe will not be required.

However, in most cases the main reservoir pressure will be below normal, and recharging must be done from the brake pipe. The ball check valve 72 prevents loss of pressure to the main reservoir when recharging the brake pipe. The fluctuations of pressure in the supply reservoirs is prevented from causing rapid fluctuations of pressure in the brake pipe by the choke plug 453.

The volume reservoir 332 may be also recharged from the emergency pipe 198, through pipe 457, ball check valve 458, and choke plug 459.

The emergency pipe 198 is in communication with the main reservoir 64 through a choke plug 461 in the brake valve device 10, pipe 66, feed valve device 70, which may be of any of the usual types, and a ball check valve 72.

The operation of the embodiment shown is as follows:

When the train is running, the handle 133 of the brake valve device 10 is maintained in release position, and pressure is maintained on the foot pedal 406 of the foot valve device 34 to hold the valve 404 therein seated.

With the brake valve device handle in release position, the supply valve 56 of the brake valve section will be seated and the release valve 80 will be unseated. Straight air pipe 134 will, therefore, be vented to the atmosphere.

In the control valve device 12, piston 222 of the relay valve section will be in its lowermost position, while piston 248 of the emergency valve section will be in its uppermost position. Ball valve 278 of the inshot valve section will be unseated, while release valve 290 of the magnet valve section 214 will be seated and supply valve 286 will be unseated.

Timing reservoir 27 will be fully charged and movable contacts 350 of pneumatic switch 28 will be out of engagement with stationary contacts 352.

At the rear of the train, valve 328 of the application magnet valve device 20 will be seated, and valve 336 of the release magnet valve device 22 will be likewise seated.

The slide valve of the triple valve device 40 will of course be in release position, as this device is operated only upon a reduction in brake pipe pressure.

The relative position of the other parts of the equipment will be as shown in Figs. 1 and 1—A.

When it is desired to effect an application of the brakes, the brake valve handle 133 is moved through the "service zone", as indicated in Figure 3, a degree in accordance with the desired degree of braking. This movement of the brake valve handle rotates cam 122 to cause seating of the release valve 80 and unseating of the supply valve 56, in the manner heretofore described.

Unseating of the supply valve 56 permits fluid to flow from the main reservoir 64 through the ball check valve device 72, the feed valve device 70, pipe 66, passage 68, past the unseated supply valve 56, to the pressure chamber 52, from whence it flows through passage 136 to the straight air pipe 134.

When the supply valve 56 is caused to be unseated, the contact element 140 carried by the spaced levers 106 bridges the stationary contacts 138 to effect a supply of current from the battery 327 to the application magnet valve device 20, through conductors 460 and 462. Energization of the electromagnet in this valve device unseats the valve 328 to permit fluid under pressure to flow from the volume reservoir 332 to the straight air pipe 134 by way of pipe 334.

It will thus be seen that fluid under pressure is supplied simultaneously to the straight air pipe 134 from both the front and rear ends of the train.

When fluid under pressure is supplied to the straight air pipe 134, it flows to the bottom face of each relay valve 222, by way of passages 254 and 256 in the emergency valve section, past the unseated ball valve 278 in the inshot valve section 212, as well as by way of the by-pass path heretofore described, and through passage 260.

Fluid pressure beneath the piston 222 actuates the piston upwardly to move the slide valve 220 to disconnect the brake cylinders from the atmosphere and to cause the rod 226 to engage the stem 236 to unseat the poppet valve 216. Unseating of the poppet valve 216 permits fluid under pressure to flow from the connected supply reservoir 218 to the connected brake cylinders past the unseated poppet valve 216.

When pressure on the under side of relay piston 222 has built up to a predetermined value, inshot piston 280 is actuated downwardly to seat the ball valve 278. After this valve is seated, fluid continues to flow through the by-pass path to the underside of piston 222 at a lower rate. The inshot valve section provides that a pressure will be established below piston 222 sufficient to insure stopping of the train in case the by-pass path is closed.

When the pressure in the pressure chamber 52 of the brake valve device has reached a predetermined value it acts upon the movable abutment 76 to overcome the pressure of the regulating spring 98, and the movable abutment is then moved to the right to cause seating of the supply valve 56, to lap the supply of fluid to the straight air pipe.

Lapping of the supply of fluid to the straight air pipe is caused at a pressure corresponding to the position of the brake valve handle 133. For short movements of this handle the supply valve 56 will be unseated a corresponding short distance, and for large movements of this handle the supply valve will be unseated a large distance. The movable abutment 76 will, therefore, be required to move a distance correspondingly to effect a seating of the supply valve.

At the same time the handle 133 is moved to application position to effect operation of the self-lapping mechanism of the brake valve section 46, the lug 174 secured to the operating shaft 132 actuates the slide valve 146 to the left to blank main reservoir passage 150 and to connect timing reservoir passage 152 to the atmosphere, to release fluid pressure from the timing reservoir 27 to the atmosphere at a predetermined rate.

The rate at which pressure is released to the atmosphere from the timing reservoir is such that if when the pressure has fallen to a value where pneumatic switch 28 causes engagement of movable contact 350 with stationary contacts 352, the pressure in the brake cylinders has not risen to a value sufficiently to cause movable contact 354 of pneumatic switch 29 to disengage stationary contacts 356, then magnet valve device 30 will have its electromagnet energized to unseat its valve 358, to release fluid pressure from the chamber 370 in the application valve device 32, to effect an emergency application of the brakes, as will hereinafter more fully be described.

If, however, the rise of brake cylinder pressure is such as to open the contacts of switch device 29, then the magnet valve device 30 will not be energized, and an emergency application of the brakes will not result.

When a sufficient pressure has been supplied to the straight air pipe, the operator may remove his foot from the foot pedal 406 of the foot valve device 34, as the valve 380 in the cut-off valve device 36 will be held seated by pressure on the upper side of the diaphragm 390, as heretofore described.

As the vehicle begins to decelerate with application of the brakes, pendulum 300 of the retardation controller device 26 will swing to the left or right, depending upon the direction of travel of the train. Assuming that the train is travelling to the left, as viewed in Figures 1 and 1—A, then the pendulum will swing to the left, as viewed in Figure 12.

If the rate of retardation produced by application of the brakes reaches a desired maximum value, then the pendulum will compress the light spring 312 to cause engagement of the movable contact 304 with the stationary contact 309. Engagement of these contacts will energize electromagnets in all of the control valve devices 12, through conductors 464 and 468, to cause all of the supply valves 286 to be seated, thus cutting off the supply of fluid to the underside of each relay piston 222, if this has not already been done by operation of the self-lapping mechanism in the brake valve device 10.

If the rate of retardation increases appreciably beyond the desired limit, then the pendulum will swing further to the left to compress the heavy spring 314, to cause engagement of movable contact 304 with stationary contact 311. Engagement of these contacts will energize the electromagnets in all of the control valve devices 12, through conductors 466 and 464, to cause unseating of all release valves 290. Fluid pressure will then be released from the face of each relay piston 222 through the choke 294, to cause the connected slide valve to release fluid pressure from the brake cylinders to the atmosphere. The safety valve device 298 functions to prevent release below a predetermined value.

When the rate of retardation has diminished to a value below the permissible limit, the pendulum 300 will swing to the right to disengage movable contact 304 from stationary contact 311, to effect a cutting off of further release of fluid pressure from the brake cylinders, by seating of the release valves 290.

If more pressure has been released from the brake cylinders than is necessary, the rate of retardation will drop to a value where the pendulum 300 swings further to the right to disengage contact 304 from stationary contact 309. Supply valves 286 will then be unseated to permit fluid under pressure to again flow to the under face of relay piston 222, to unseat the poppet valve 216 to again supply fluid under pressure to the brake cylinders.

The brake valve device 10 will automatically function to maintain pressure in chamber 52 in accordance with the position of the brake valve handle. However, regardless of the position of the brake valve handle, the retardation controller device will function to reduce brake cylinder pressures if the rate of retardation due to the brake valve application exceeds the predetermined desired maximum.

Condensers 465 are connected across conductors 464 and 468 to reduce the arcing at the contacts of the retardation controller device.

If it is desired to effect an emergency application of the brakes with the brake valve device, then the handle 133 is moved to "emergency" position, as indicated in Figure 3. In this position the floating pivot carrier 108 is moved to its extreme position to the right, whereupon a maximum pressure will be maintained in pressure chamber 52 as provided for by the brake valve device.

At the same time, the slot face 194 in the operating shaft 132 will engage the valve stem 196 to unseat the emergency valve 190, to vent the emergency pipe 198 to the atmosphere, as heretofore described. This sudden reduction in emergency pipe pressure causes emergency piston 248 in the control valve device to be actuated to its lowermost position, by the overbalancing pressure on the upper side thereof, whereupon slide valve 246 is moved downwardly to connect each supply reservoir 218 directly with the underside of each relay piston 222, through passages as heretofore described. The piston 222 will then be actuated to its uppermost position to unseat poppet valve 216 so that fluid may flow from the supply reservoirs to the brake cylinders at a maximum rate.

It is to be noted that in emergency applications the brake valve device 10 operates to supply fluid at a maximum pressure to the straight air pipe, but that the emergency slide valve 246 cuts off communication between the straight air pipe and the underside of relay piston 222 when it connects the supply reservoir direct to the underside of the relay piston. However, if the emergency valve section should fail to operate for any reason, then fluid under pressure will be supplied to the underside of the relay piston from the straight air pipe.

The inshot valve section 212 will operate as before to insure a definite supply of fluid under pressure to the under face of each relay piston 222, and the retardation controller device, in conjunction with the magnet valve section 214, will function to reduce brake cylinder pressure should the rate of retardation exceed that for which the retardation controller device is adjusted.

The retardation controller device is intended to be adjusted to limit the rate of retardation to a value which may be attained without sliding of the wheels. This value is usually that obtainable with the maximum adhesion between wheels and rails for given track conditions.

An emergency application of the brakes may, of course, be effected by removing pressure from the foot pedal 406 of the foot valve device 34 with the brake valve handle in release position. This, however, is intended to be utilized only in case of physical incapacity of the operator.

Provision for effecting an emergency application of the brakes from the second or third car in the train may be made by providing conductor's valve 470 thereon connected with the emergency pipe through pipes 457 and 472. These valves may have a lever 474 adapted to unseat a valve 476 to release pressure from the emergency pipe to the atmosphere through a port 478.

When it is desired to release the brakes through the brake valve device, the handle 133 is moved to "Release" position. In this position release valve 80 is unseated to release fluid pressure from chamber 52. At the same time, contacts 144 engage to energize the release magnet valve device 22 through conductor 480, now engaged contacts 346 and 348 and conductor 462, to unseat valve 336. Pressure in the straight air pipe 134 is thus released to the atmosphere at both ends, so that relay pistons 222 drop quickly to their lowermost position to release fluid pressure from the brake cylinders to the atmosphere, as heretofore described. It will be observed that ball valve 278 in each control valve will readily unseat to permit a complete release even though the communication through the magnet valve portion may be closed.

When it is desired to effect an application of the brakes from the rear end of the train, as when backing up, the brake valve handle 133 is maintained in release position, and hand wheel 418, of the backing up and whistle device 38, is actuated to cause segmental valve 412 to uncover port 420, to vent the brake pipe 42 to the atmosphere. Reduction of brake pipe pressure in this manner causes the piston 450 in triple valve device 40 to be actuated to service position against graduating stem 451, whereupon fluid under pressure flows from the auxiliary reservoir 436 to the portion of the straight air pipe 134 extending throughout the train, to effect a supply of fluid under pressure to the brake cylinders in the manner already described.

A release of the brakes may be effected by actuating the segmental valve 412 to blank off the port 420, whereupon brake pipe pressure will be restored from the main reservoir 64 to cause piston 450 of the triple valve device to move to release position.

During backing up movement, warning may be given by pressing the button 426 to cause operation of the whistle 424.

When the train is being towed "dead", the brake pipe 42 is connected to the brake pipe of the towing vehicle, and the double cut-out cock 448 is moved to cut-out position. The brakes may be applied then by reducing brake pipe pressure, in the usual manner, from the towing vehicle.

The "Handle Off" position of the brake valve device 10 is provided so that when leaving the train for short intervals the operator may remove the handle and take it with him when desired, the brakes then being left applied.

It will thus be seen that I have provided a highly flexible brake equipment for high speed, multiple unit trains, in which provision is made for fast application and fast release of the brakes from a single brake valve device on the control car at the head end of the train. It will further be seen that I have provided apparatus for insuring an application of the brakes upon a failure of the equipment to respond to movement of the brake valve device handle to service position, as well as for controlling the maximum rate of retardation due to application of the brakes.

The equipment as described and illustrated comprises an arrangement of simple and reliable component parts, which may be grouped throughout the train so as to require a minimum space and yet be readily accessible for routine inspection.

In practicing my invention, it will be obvious to those skilled in the art that I may make a number of modifications in the embodiment shown, or may embody my invention in other than the specific apparatus shown, and I therefore, do not wish to be limited to this exact embodiment, or otherwise than by the spirit and scope of the appended claims.

Having now described my invention, what I claim as new and desire to secure by Letters Patent, is:

1. In a railway train brake system, the combination with a plurality of brake cylinders for one or more units in the train, of a plurality of control valve devices for controlling the supply of fluid under pressure to and its release from said brake cylinders, each of said devices having a relay valve section and an emergency valve section, a control pipe adapted to extend throughout the train for supplying fluid under pressure to operate said relay valve section, an emergency pipe adapted to also extend throughout the train for maintaining a predetermined pressure in said emergency section, means for supplying fluid under pressure to said control pipe to effect operation of said relay valve section to supply fluid under pressure to said brake cylinders at a service rate, and means operable upon failure of said relay valve section to effect a chosen brake cylinder pressure in a predetermined length of time for reducing the pressure in said emergency pipe to cause said emergency valve section to supply fluid under pressure to said brake cylinders at an emergency rate.

2. In a railway train brake system, the combination with a plurality of brake cylinders for one or more units in the train, of a control valve device having a relay valve portion and an emergency valve portion for controlling the supply of fluid under pressure to and its release from said brake cylinders, a control pipe adapted to extend throughout the train for supplying fluid under pressure to said valve device for causing operation of said relay valve portion, an emergency pipe for maintaining a predetermined pressure in said emergency valve portion, means controllable from one point in the train for effecting a supply of fluid under pressure to said control pipe to cause said relay valve portion to operate to supply fluid under pressure to said brake cylinders, and means rendered operable by operation of said last means for reducing the pressure in said emergency pipe to cause said emergency portion to effect an emergency supply of fluid under pressure to said brake cylinders upon failure of said relay portion to supply fluid to said brake cylinders at a given rate.

3. In a railway vehicle brake system, the combination with a plurality of brake cylinders, of means for effecting a supply of fluid under pressure to said brake cylinders for service applications of the brakes, separate means for effecting a supply of fluid under pressure to said brake cylinders for emergency applications of the brakes, means responsive to a chosen brake cylinder pressure for varying the rate of supply of fluid to said brake cylinders for both service and emergency applications, and means for rendering said emergency means effective upon failure of said service means to respond to a service application of the brakes after a predetermined interval of time.

4. In a railway brake system, the combination with a plurality of brake cylinders, of valve means for controlling the supply of fluid under pressure to said brake cylinders, a control pipe for supplying fluid under pressure to operate said valve means to effect a service application of the brakes, an emergency pipe normally maintained under pressure and adapted to operate said valve means upon a reduction in the pressure therein to effect an emergency application of the brakes, brake valve means for supplying fluid under pressure to said control pipe and for reducing the pressure in said emergency pipe, triple valve means for also supplying fluid under pressure to said control pipe, a brake pipe normally maintained under pressure and adapted to effect operation of said triple valve device upon a reduction in pressure therein, and means for effecting a reduction in brake pipe pressure independently of operation of said brake valve device.

5. In a railway train brake system, the combination with a plurality of brake cylinders, of a plurality of control valve devices for controlling the supply of fluid under pressure to and its release from said brake cylinders, a control pipe for supplying fluid under pressure to operate said valve devices, a brake valve device having contained therein a self-lapping mechanism for controlling the supply of fluid under pressure to and its release from said pipe at one point, magnet valve devices for controlling the supply of fluid under pressure to and its release from said pipe at another point, and contacts contained in said brake valve device and associated with said self-lapping mechanism for controlling operation of said magnet valve devices.

6. In a railway train brake system, in combination, a plurality of brake cylinders, control valve devices for controlling the supply of fluid under pressure to and its release from said brake cylinders, a control pipe for supplying fluid under pressure to operate said valve devices, a brake valve device having a supply valve and a release valve for controlling the supply of fluid under pressure to and its release from said control pipe at one point, a contact operated by said supply valve and opened when said supply valve is opened and closed when said supply valve is closed, a second contact operated by said release valve and opened when said release valve is closed and closed when said release valve is opened, an application magnet valve device and a release magnet valve device for controlling the supply of fluid under pressure to and its release from said control pipe at another point, a source of current supply, a circuit for connecting said application magnet valve device to said first contact and said source, a second circuit for connecting said release magnet valve device to said second contact and said source, and a circuit controller responsive to the pressure in said control pipe for controlling said second circuit and operable to close said circuit at a predetermined pressure and to open said circuit below said predetermined pressure.

7. In a railway train brake system, in combination, a plurality of brake cylinders, control valve devices for controlling the supply of fluid under pressure to and its release from said brake cylinders, a straight air pipe for supplying fluid under pressure to operate said valve devices, a brake valve device having a supply valve and a release valve for controlling the supply of fluid under pressure to and its release from said straight air pipe at one point, said brake valve device having a control element and being operable to automatically lap the supply to said straight air pipe according to the degree of movement of said element, an application magnet valve device operable to effect a supply of fluid under pressure to said straight air pipe at another point, a contact on said brake valve device operated according to operation of said supply valve, a source of current supply, and a circuit for connecting said application magnet valve device to said contact and to said source, whereby said magnet valve device is operated to supply fluid under pressure to said straight air pipe according to operation of said supply valve.

8. In a railway train brake system, in combination, a plurality of brake cylinders, control valve devices for controlling the supply of fluid under pressure to and its release from said brake cylinders, a straight air pipe for supplying fluid under pressure to operate said valve devices, a brake valve device having a supply valve and a release valve for controlling the supply of fluid under pressure to and its release from said straight air pipe at one point, a contact operated by said supply valve, a contact operated by said release valve, said brake valve device having a control element and being operable to automatically effect a lap of the supply to said straight air pipe according to the degree of movement of said element, an application magnet valve device and a release magnet valve device operable to control the supply of fluid under pressure to and its release from said straight air pipe at another point, a source of current supply, circuits for connecting said magnet valve devices to said contacts and to said source, whereby said magnet valve devices are caused to operate according to operation of said supply and release valves, means for preventing operation of said release magnet valve device below a predetermined pressure in said straight air pipe, and means for restricting the rate of release of fluid under pressure from said straight air pipe by operation of said release magnet valve device.

9. In a train brake system, in combination, a plurality of brake cylinders, a plurality of valve devices for controlling the supply of fluid under pressure to and its release from said brake cylinders, a straight air pipe for supplying fluid under pressure to operate said valve devices, means for effecting an unrestricted supply of fluid under pressure to and an unrestricted release from said straight air pipe at one point, means for effecting an unrestricted supply of fluid under pressure to and a restricted release from said straight air pipe at another point, and means for preventing said restricted release when the pressure at said other point diminishes below a predetermined value.

10. In a railway train brake system, the combination with a plurality of brake cylinders for one or more units in the train, of a plurality of control valve devices for controlling the supply of fluid under pressure to and its release from said brake cylinders, each of said devices having a relay valve and an emergency valve, said relay valve being operated upon an increase in pressure for effecting a supply of fluid under pressure to said brake cylinders and said emergency valve being operated upon a decrease in pressure to effect a supply of fluid under pressure to said brake cylinders, a straight air pipe adapted to extend through the train for supplying fluid under pressure to operate said relay valves, a normally charged emergency pipe adapted to also extend throughout the train for maintaining a predetermined pressure in said emergency valves, means for effecting a supply of fluid under pressure to said straight air pipe to effect operation of said relay valves, means rendered operable after a predetermined interval of time for effecting a reduction in emergency pipe pressure, and means responsive to a predetermined brake cylinder pressure for preventing operation of said last means.

11. In a railway train brake system, the combination with a plurality of brake cylinders, of a normally discharged straight air pipe, a normally charged emergency pipe, means responsive to an increase in pressure in said straight air pipe for effecting a supply of fluid under pressure to said brake cylinders, means responsive to a decrease in pressure in said emergency pipe for effecting a supply of fluid under pressure to said brake cylinders, means including a magnet valve device operable when said magnet valve device is energized to effect a reduction in emergency pipe pressure, a circuit for connecting said magnet valve device to a source of current supply, means for effecting a supply of fluid under pressure to said straight air pipe, switch means having normally open contacts in said circuit and rendered operable when said last means is operated to close said contacts after a predetermined interval of time, and a second switch means having normally closed contacts in said circuit and operable at a predetermined brake cylinder pressure to open said contacts.

12. In a train brake system, in combination, a brake cylinder, a normally discharged straight air pipe, means responsive to an increase in pressure in said pipe for effecting a supply of fluid under pressure to said brake cylinder to effect a service application of the brakes, a normally charged emergency pipe, means responsive to a reduction in pressure in said pipe for effecting a supply of fluid under pressure to said brake cylinder to effect an emergency application of the brakes, means for controlling the supply of fluid under pressure to and its release from said pipes, contact means responsive to brake cylinder pressure and closed or opened according as such pressure is below or above a predetermined value, a second contact means having normally open contacts, means for effecting closing of said normally open contacts after a given interval of time upon initiating a supply of fluid under pressure to said straight air pipe, and auxiliary means rendered operable when the contacts of both of said contact means are closed simultaneously for venting fluid under pressure from said emergency pipe.

13. In a train brake system, in combination, a brake cylinder, a valve device operated upon an increase in pressure for effecting a supply of fluid under pressure to said brake cylinder, means for establishing a communication through which fluid under pressure is supplied to operate said valve device, an emergency valve device operated upon a decrease in pressure for cutting off said communication, a second valve device operated upon a predetermined pressure for closing a portion of said communication, and a magnet valve device operable when energized to close another portion of said communication.

14. In a train brake system, in combination, a brake cylinder, a valve device operated upon an increase in pressure for effecting a supply of fluid under pressure to said brake cylinder, means for establishing a communication through which fluid under pressure is supplied to operate said valve device, means for effecting a supply of fluid under pressure through said communication, an electroresponsive valve device operable when energized to close said communication, means for establishing a by-pass communication around said electroresponsive valve device, and means controlling said by-pass communication and operable to close said by-pass communication at a predetermined pressure of fluid supplied therethrough.

15. In a railway train brake system, the combination with a brake cylinder, of a valve device operated upon an increase in pressure for effecting a supply of fluid under pressure to said brake cylinder, means for establishing a communication having parallel branch paths through which fluid under pressure is supplied to operate said valve device, a second valve device in one of said branch paths operated upon a predetermined pressure for closing said branch path, a magnet valve device in the other of said branch paths and operable to close said other branch path, and a retardation controller device for controlling said magnet valve device.

16. In a train brake system, in combination, a brake cylinder, a relay valve device operated according to the supply of fluid under pressure thereto for controlling the supply of fluid under pressure to said brake cylinder, means for establishing a communication through which fluid under pressure is supplied to operate said relay valve device, a portion of said communication having parallel branch paths, means for effecting a graduated supply of fluid under pressure through said communication, a second valve device operated upon a decrease in pressure for closing said communication to said graduated supply and for connecting said communication to an ungraduated source of supply, a third valve device in one of said branch paths and operated upon a predetermined pressure to close said branch path, a magnet valve device in the other of said branch paths and operable to close said other branch path, a second magnet valve device operable to release fluid under pressure from said communication, and a retardation controller device for controlling both of said magnet valve devices.

17. In a train brake system, in combination, a brake cylinder, a relay valve device operated according to the supply of fluid under pressure thereto for controlling the supply of fluid under pressure to and its release from said brake cylinder, means for establishing a communication through which fluid under pressure is supplied to operate said relay valve device, means for effecting a graduated supply of fluid under pressure through said communication, a normally charged pipe, a second valve device operated upon a decrease in pressure in said pipe for closing said communication to said graduated supply and for connecting said communication to a source of ungraduated supply, a cut-off magnet valve device operable to close said communication to either supply, a third valve device operable to by-pass fluid under pressure around said cut-off valve device below a predetermined pressure, a release magnet valve device operable to release fluid under pressure from said communication, a retardation controller device for controlling said two magnet valve devices, means for restricting the rate of release of fluid under pressure from said communication by said release magnet valve device, and means for preventing said release below a predetermined pressure.

18. In a railway train brake system, in combination, a plurality of brake cylinders, control valve devices for controlling the supply of fluid under pressure to and its release from said brake cylinders, a control pipe for supplying fluid under pressure to operate said valve devices, a brake valve device having a supply valve and a release valve for controlling the supply of fluid under pressure to and its release from said control pipe at one point, a contact operated by said supply valve and opened when said supply valve is opened and closed when said supply valve is closed, a second contact operated by said release valve and opened when said release valve is closed and closed when said release valve is opened, an application magnet valve device and a release magnet valve device for controlling the supply of fluid under pressure to and its release from said control pipe at another point, a source of current supply, a circuit for connecting said application magnet valve device to said first contact and said source, and a second circuit for connecting said release magnet valve device to said second contact and said source.

19. In a railway train brake system, in combination, a plurality of brake cylinders for braking the different cars in the train, a plurality of supply reservoirs for the different units in the train, a plurality of control valve devices for the different units in the train for controlling the supply of fluid under pressure from said supply reservoirs to said brake cylinders, a control pipe adapted to extend throughout the train for supplying fluid under pressure to operate said valve devices, a main reservoir adapted to be located on a car at the head end of the train, a brake valve device for the head end of the train having a supply valve and a release valve for controlling the supply of fluid under pressure from said main reservoir to said control pipe and for controlling the release of fluid under pressure from said control pipe, a contact operated by said supply valve and opened when said supply valve is opened and closed when said supply valve is closed, a second contact operated by said release valve and opened when said release valve is closed and closed when said release valve is opened, a volume reservoir normally charged with fluid under pressure and adapted to be located on a car adjacent the rear of the train, an application magnet valve device and a release magnet valve device for controlling the supply of fluid under pressure from said volume reservoir to said control pipe and for controlling the release of fluid under pressure from said control pipe, a source of current supply, a circuit for connecting said application magnet valve device to said first contact and said source, and a second circuit for connecting said release magnet valve device to said second contact and said source.

20. In a railway train brake system, in combination, a plurality of brake cylinders, control valve devices for controlling the supply of fluid under pressure to and its release from said brake cylinders, a straight air pipe for supplying fluid under pressure to operate said valve devices, a brake valve device having a supply valve and a release valve for controlling the supply of fluid under pressure to and its release from said straight air pipe at one point, a contact operated when said supply valve is operated, a contact operated when said release valve is operated, said brake valve device having a control element and being operable to automatically effect a lap of the supply to said straight air pipe according to the degree of movement of said control element, an application magnet valve device and a release magnet valve device operable to control the supply of fluid under pressure to and its release from said straight air pipe at a different point, a source of current supply, circuits for connecting said magnet valve devices to said contacts and to said source, whereby said magnet valve devices are caused to operate according to operation of said supply and release valves, and means for restricting the rate of release of fluid under pressure from said straight air pipe by operation of said release magnet valve device.

21. In a train brake system, in combination, a brake cylinder, a valve device operated upon an increase in pressure for effecting a supply of fluid under pressure to said brake cylinder, means for establishing a communication through which fluid under pressure is supplied to operate said valve device, means for effecting a supply of fluid under pressure through said communication, a first electroresponsive valve device operable when energized to close said communication, means for establishing a by-pass communication around said electroresponsive valve device, means controlling said by-pass communication and operable to close said by-pass communication at a predetermined pressure of fluid supplied therethrough, a second electroresponsive valve device operable when energized to release fluid under pressure from said first communication when said first electroresponsive valve device is energized, and a safety valve device for preventing the release of fluid under pressure from said first communication below a predetermined value.

22. In a fluid pressure brake system, in combination, a normally charged supply reservoir from which fluid under pressure is adapted to be supplied to effect an application of the brakes, a main reservoir, means for establishing a first communication from said main reservoir to said supply reservoir, means for establishing a second communication from said main reservoir to said supply reservoir, a valve device disposed in said first communication and adapted to close said first communication upon a reduction in the pressure of fluid in said first communication, and a check valve device and a choke device in said second communication operable to permit flow of fluid from said main reservoir to said supply reservoir when said first communication is closed but operable to prevent flow of fluid from said supply reservoir to said main reservoir.

23. In a vehicle brake system, in combination, a brake cylinder, a relay valve device operated upon an increase in pressure for effecting a supply of fluid under pressure to said brake cylinder and operated upon a decrease in pressure for effecting a release of fluid under pressure from said brake cylinder, means for establishing a communication through which fluid under pressure is supplied to operate said relay valve device, an emergency valve device operated upon a decrease in pressure for effecting a supply of fluid under pressure through said communication, an electroresponsive valve device operable when energized to close said communication, means for establishing a by-pass communication around said electroresponsive valve device, and means controlling said by-pass communication and operable to close said by-pass communication at a predetermined pressure of fluid supplied therethrough.

24. In a train brake system, in combination, a brake cylinder, a relay valve device operated upon an increase in pressure for effecting a supply of fluid under pressure to said brake cylinder and operated upon a decrease in pressure for effecting a release of fluid under pressure from said brake cylinder, means for establishing a communication through which fluid under pressure is supplied to operate said relay valve device, an emergency valve device operated upon a decrease in pressure to supply fluid under pressure through said communication, an electroresponsive cut-off valve device operable when energized to close said communication, an electroresponsive release valve device operable when energized to release fluid under pressure from said communication so long as said cut-off valve device is energized, means for establishing a by-pass communication around said electroresponsive cut-off valve device, and means controlling said by-pass communication and operable to close said by-pass communication at a predetermined pressure of fluid supplied therethrough.

25. In a railway train brake system, in combination, a brake cylinder, a valve device operated upon an increase in pressure for effecting a supply of fluid under pressure to said brake cylinder, means for establishing a communication having parallel branch paths through which fluid under pressure is supplied to operate said valve device, an emergency valve device operated upon a decrease in pressure to supply fluid under pressure through said communication, a second valve device in one of said branch paths operated upon a predetermined pressure for closing said branch path, a magnet valve device in the other of said branch paths and operable to close said other branch path, and a retardation controller device for controlling said magnet valve device.

26. In a train brake system, in combination, a plurality of brake cylinders, a straight air pipe adapted to extend throughout the train and normally at atmospheric pressure, an emergency pipe also adapted to extend throughout the train and normally charged with fluid under pressure, means operated upon a supply of fluid under pressure to said straight air pipe for effecting a supply of fluid under pressure to said brake cylinders, means operated upon a reduction of pressure in said emergency pipe for also effecting a supply of fluid under pressure to said brake cylinder, and a brake valve device for the head end of the train having a normally seated supply valve and a normally unseated release valve for controlling the supply of fluid under pressure to and its release from said straight air pipe, and having a normally seated emergency valve operable when unseated to reduce the pressure of fluid in said emergency pipe, said brake valve device also having a handle and means responsive to movement of said handle through one zone for seating said release valve and unseating said supply valve and responsive to movement of said handle through a different zone for unseating said emergency valve, said supply valve having means associated therewith for closing it when the pressure of fluid supplied therethrough corresponds to the degree of movement of said handle.

27. In a train brake system, in combination, a plurality of brake cylinders, a straight air pipe adapted to extend throughout the train and normally at atmospheric presure, an emergency pipe also adapted to extend throughout the train and normally charged with fluid under pressure, means operated upon the supply of fluid under pressure to said straight air pipe for effecting a supply of fluid under pressure to said brake cylinders, means operated upon a reduction of the pressure of fluid in said emergency pipe for also effecting a supply of fluid under pressure to said brake cylinders, a brake valve device for the head end of the train having a supply valve and a release valve for controlling the supply of fluid under pressure to and its release from said straight air pipe at the head end of the train and having an emergency valve adapted when operated to reduce the pressure of fluid in said emergency pipe, said brake valve device also having a first contact operated when said supply valve is operated and a second contact operated when said release valve is operated, an application magnet valve device and a release magnet valve device adapted to be located on a car adjacent the rear of the train for controlling the supply of fluid under pressure to and its release from said straight air pipe at that point, and circuits for connecting said application magnet valve device to said first contact and said release magnet valve device to said second contact, said brake valve device being adapted to operate said supply and release valves and said two contacts when effecting both service and emergency applications of the brakes, and being adapted to operate said emergency valve when effecting emergency applications of the brakes.

28. In a vehicle brake system, in combination, a brake cylinder, an emergency pipe normally charged with fluid under presure, a straight air pipe normally at atmospheric pressure, means operative upon a reduction of pressure in said emergency pipe for effecting a supply of fluid under pressure to said brake cylinder, means operative upon a supply of fluid under pressure to said straight air pipe for also effecting a supply of fluid under pressure to said brake cylinder, a brake valve device operable through a first zone to supply fluid under pressure to said straight air pipe and operable through a second zone for effecting a reduction of pressure in said emergency pipe, an application valve device having a chamber and operable upon a reduction of pressure in said chamber to effect a reduction of pressure in said emergency pipe independently of operation of said brake valve device in said second zone, means for establishing a communication between said chamber and the atmosphere, a foot valve device located at the end of said communication away from said chamber and adapted to close said communication to the atmosphere when pressure is manually applied thereto and operable to open said communication to the atmosphere when said manually applied pressure is released, and a cut-off valve device disposed in said communication between said chamber and said foot valve device and adapted to close said communication when fluid at a predetermined pressure is supplied to said straight air pipe by operation of said brake valve device in said first zone.

29. In a train brake system, in combination, a brake cylinder, a brake pipe, a triple valve device operated upon a reduction in brake pipe pressure for effecting a supply of fluid under pressure to said brake cylinder, a source of supply of fluid under pressure, means for establishing a first communication from said source to said brake pipe, means for establishing a second communication from said brake pipe to said source, a choke device and a check valve device in said second communications, said check valve device being operable to prevent flow of fluid from said source to said brake pipe and operable to permit flow from said brake pipe to said source, and a cut-out cock in said first communication operable manually to close said first communication.

30. A brake valve device comprising in combination a casing defining a pressure chamber, a normally seated supply valve for controlling the supply of fluid under pressure to said chamber, a normally unseated release valve for controlling the release of fluid under pressure from said chamber, a control handle, means responsive to movement of said handle through a first zone for effecting seating of said release valve and unseating of said supply valve, means responsive to the pressure of fluid in said chamber for subsequently effecting seating of said supply valve, a first set of contacts operated according to operation of said supply valve, a second set of contacts operated according to operation of said release valve, a normally seated emergency valve, and means responsive to movement of said handle in a second zone for unseating said emergency valve.

31. A brake valve device comprising in combination, a control handle, a normally unseated release valve and a normally seated supply valve adapted to be operated in response to movement of said handle, a slide valve normally maintaining communication between two passages, and means for actuating said slide valve concurrently with operation of said supply and release valves to connect one of said two passages to the atmosphere.

32. A brake controlling device comprising, in combination, a valve mechanism for controlling a communication through which fluid under pressure is supplied in effecting an application of the brakes and a communication through which fluid under pressure is released in effecting a release of the brakes, electrical contact means for also controlling application and release of the brakes, manually operated means for simultaneously operating said valve mechanism and said contact means to effect an application of the brakes, and fluid pressure operated means for simultaneously operating said valve mechanism and said contact means to effect a lap of said application of the brakes.

33. In a vehicle brake system, in combination, electroresponsive means for controlling a communication through which fluid under pressure is supplied in effecting an application of the brakes, a valve mechanism for controlling a separate communication through which fluid under pressure is supplied in effecting an application of the brakes, electrical contact means for controlling operation of said electroresponsive means, manually operated means for simultaneously operating said valve mechanism and said contact means to effect an application of the brakes, and fluid pressure operated means for operating said valve mechanism and said contact means to effect a lap of said application of the brakes.

34. In a vehicle brake system, in combination, a brake cylinder, a relay valve device for controlling the supply of fluid under pressure to and its release from said brake cylinder, a pipe through which fluid under pressure is supplied to effect operation of said relay valve device, a magnet valve device operable to control a supply of fluid under pressure to said pipe at one point, a valve mechanism operable to supply fluid under pressure to said pipe at a different point, electrical contact means for controlling operation of said magnet valve device, manually operated means for mechanically and simultaneously operating said valve mechanism and said contact means to effect a supply of fluid under pressure to said pipe, and fluid pressure operated means for subsequently operating said valve mechanism and said contact means to effect a lap of the supply of fluid under pressure to said pipe.

35. In a brake equipment for vehicles, in combination, braking means, electroresponsive control means for controlling application and release of said braking means, pneumatic control means for also controlling application and release of said braking means, manually operated means operable through different degrees of movement for effecting simultaneous operation of said electroresponsive control means and said pneumatic control means to effect an application of said braking means, and lapping means for subsequently effecting simultaneous operation of said electroresponsive control means and said pneumatic control means when the degree of application of said braking means corresponds to the degree of operation of said manually operated means.

36. In a fluid pressure brake equipment, in combination, a brake cylinder, magnet valve devices for controlling the supply of fluid under pressure to and its release from said brake cylinder, valve means for also controlling the supply of fluid under pressure to and its release from said brake cylinder, operating means comprising a casing defining a chamber and a handle movable to an application position to effect simultaneous operation of said magnet valve devices and said valve means to effect a supply of fluid under pressure to said brake cylinder and to said chamber, and means operated by the supply of fluid under pressure to said chamber for effecting operation of said magnet valve devices and said valve means to lap the supply of fluid under pressure to said brake cylinder according to the degree of movement of said handle.

37. In a brake equipment for vehicles, a plurality of braking units each of which comprises at least one brake cylinder; automatic means including a normally charged pipe and at least one automatic valve device operated upon a reduction of pressure in said pipe for controlling the supply of fluid under pressure to and its release from the brake cylinders associated with said braking units; straight air means including a straight air pipe for controlling the supply of fluid under pressure to the brake cylinders associated with each of said braking units according to the pressure of fluid in said pipe; magnet valve means associated with one or more of said braking units for supplying fluid under pressure to said straight air pipe; brake valve means for separately supplying fluid under pressure to said straight air pipe and for simultaneously controlling operation of said magnet valve means; said automatic valve device being adapted to interrupt the control of brake cylinder pressure by straight air pipe pressure upon operation thereof to a brake applying position; a retardation controller device operated according to the rate of retardation of the vehicle; and means responsive to operation of said retardation controller device at a predetermined rate of retardation for interrupting the control of brake cylinder pressure by either straight air pipe pressure or operation of said automatic valve device, and effective to release fluid under pressure from said brake cylinders at a rate of retardation greater than said predetermined rate.

38. In a brake equipment for vehicles, in combination, a brake cylinder, automatic means including a charged pipe and an automatic valve device operated according to the pressure of fluid in said charged pipe for controlling the supply of fluid under pressure to said brake cylinder, straight air means including a straight air pipe for controlling the supply of fluid under pressure to said brake cylinder, a brake valve device for supplying fluid under pressure to said straight air pipe upon movement through a straight air zone and for effecting a reduction in pressure in said charged pipe upon operation through a pneumatic zone, said automatic valve device being adapted in release position to render said supply to said straight air pipe effective in controlling brake cylinder pressure and being adapted to render said supply to said straight air pipe ineffective in controlling brake cylinder pressure when operated to a brake applying position, a retardation controller device responsive to the rate of retardation of the vehicle, means controlled by said retardation controller device for effecting a reduction in brake cylinder pressure whether initially established by pressure in the straight air pipe or by operation of the automatic valve device.

39. In a fluid pressure brake system, in combination, a brake cylinder, manually operable brake control means operable to a plurality of service positions and to an emergency position, means responsive to operation of said control means to a predetermined service application position or to said emergency position for effecting an emergency application of the brakes, means responsive to said movement of said control means to said predetermined service application position for effecting a service application of the brakes, and means responsive to a predetermined brake cylinder pressure for preventing the said emergency application upon movement of said control means to said predetermined service application position.

40. In a railway train brake system, in combination, a plurality of brake cylinders for one or more cars in the train for applying the brakes on the different units in the train, valve means associated with one or more cars in the train for controlling the supply of fluid under pressure to and its release from said brake cylinders, a pipe adapted to extend throughout the train to supply fluid under pressure to operate said valve means, remote controlled means associated with other than the head end car in the train for controlling supply of fluid under pressure to and its release from said pipe, a brake valve mechanism for the head end car of the train for separately controlling supply of fluid under pressure to and its release from said pipe and for simultaneously controlling the operation of said remote controlled means, said brake valve mechanism and remote controlled means being operable to establish pressures in said pipe corresponding to the degree or extent of movement of a handle associated with said brake valve mechanism, and means responsive to a chosen pressure in said pipe for preventing release of fluid under pressure from said pipe by said remote controlled means.

41. In a railway brake system, the combination with a plurality of brake cylinders, of a plurality of supply reservoirs, a plurality of control valve devices, each of said devices being adapted to control the supply of fluid under pressure from one of said reservoirs to certain of said brake cylinders, a control pipe adapted to extend throughout the train for supplying fluid under pressure to said valve devices to control service operations thereof, an emergency pipe normally maintained under pressure and adapted to extend throughout the train for controlling emergency operations of said valve devices, a first control means operable from one point in the train for supplying fluid under pressure to said control pipe, a second control means controlled by said last means and operated synchronously therewith for controlling the supply of fluid under pressure to said control pipe at a different point in the train, the supply of fluid under pressure to said pipe causing operation of said valve devices to cause fluid under pressure to be supplied from said reservoirs to said brake cylinders, means responsive to a chosen operation of said first control means for reducing pressure in said emergency pipe to also effect operation of said control valve devices to cause fluid under pressure to be supplied from said reservoirs to said brake cylinders, and means controlled by the rate of retardation due to application of the brakes for subsequently regulating the pressure in said brake cylinders to maintain a desired rate of retardation.

42. In a fluid pressure brake system, in combination, a normally charged pipe, valve means operated upon a reduction in fluid pressure for venting fluid under pressure from the normally charged pipe, safety control means operative upon release by an operator for venting fluid under pressure from said valve means, a brake cylinder, means for supplying fluid under pressure to said brake cylinder to effect an application of the brakes, electrically controlled means operative to vent fluid under pressure from said valve means, and means for effecting the operation of said electrically controlled means dependent upon the rate of build up of brake cylinder pressure.

43. In a fluid pressure brake system, the combination with a brake cylinder and a supply reservoir, of means for effecting a supply of fluid under pressure from said supply reservoir to said brake cylinder by straight air operation, means including an emergency valve device for effecting a supply of fluid under pressure from said supply reservoir to said brake cylinder by automatic operation, a brake valve device having a handle operable through one zone to control the degree of application of the brakes by straight air operation according to the degree or extent of movement of said handle and operable through another zone to control the application of the brakes by automatic operation, a normally deenergized magnet valve device operable when energized to effect operation of said emergency valve device to effect an application of the brakes by automatic operation, a normally open circuit connecting said magnet valve device to a source of current supply, switch means adapted to close said circuit, means operated upon movement of said brake valve handle to effect an application of the brakes by straight air operation for actuating said switch means to close said circuit, and means responsive to brake cylinder pressure for opening said circuit.

44. In a railway train brake system, the combination with brake cylinders for one or more units in the train, of means for effecting a supply of fluid under pressure to said brake cylinders by electro-pneumatic operation, means for effecting a supply of fluid under pressure to said brake cylinders by straight air operation, means for effecting a supply of fluid under pressure to said brake cylinders by automatic operation, control means for manually controlling said last three means, and means responsive to fluid under pressure supplied by one of said operations for operating said control means to effect a lapping of the supply effected by that means in accordance with a desired degree of braking.

45. In a railway train brake system, the combination with a plurality of brake cylinders, of a plurality of control valve devices for controlling the supply of fluid under pressure to and its release from said brake cylinders, a control pipe for supplying fluid under pressure to operate said valve devices, a brake control means having a self-lapping mechanism for controlling the supply of fluid under pressure to and its release from said pipe at one point, magnet valve devices for controlling the supply of fluid under pressure to and its release from said pipe at another point, and contacts associated with said brake control means for controlling operation of said magnet valve devices.

46. In a vehicle brake equipment, a pipe normally charged with fluid under pressure, valve means normally in a certain position and operative to another position upon a reduction of pressure in said pipe to establish a communication having parallel branches through which fluid under pressure is supplied to effect an application of the brakes, inshot valve means in one of said branches effective to close that branch only at a predetermined pressure of the fluid supplied therethrough, and magnet valve means for controlling the other of said branches.

47. In a vehicle brake equipment, in combination, a control pipe, means responsive to an increase in pressure in said control pipe to effect an application of the brakes and to a reduction in pressure in said pipe for effecting a release of the brakes, a pipe normally charged with fluid under pressure, valve means normally in a certain position and operative upon a reduction of pressure in the normally charged pipe to another position to supply fluid under pressure to a communication having two separate parallel branches through which fluid under pressure is supplied to increase the pressure in said control pipe, inshot valve means effective to close one of said branches only when the pressure in the control pipe exceeds a predetermined pressure, and means controlled according to the rate of retardation of the vehicle for closing the other of said communications against the supply of fluid under pressure therethrough and for releasing fluid under pressure from said control pipe.

48. In a vehicle brake equipment, in combination, a control pipe, means responsive to an increase in pressure in said control pipe to effect application of the brakes and to a reduction in pressure in said pipe for effecting release of the brakes, a pipe normally charged with fluid under pressure, valve means normally in a certain position and operative to another position upon a reduction of pressure in the normally charged pipe to establish two separate parallel communications through which fluid under pressure is supplied to increase the pressure in said control pipe, inshot valve means effective to close one of said communications only when the pressure in said control pipe exceeds a predetermined pressure, means controlled according to the rate of retardation of the vehicle for closing the other of said communications against the supply of fluid under pressure therethrough and for releasing fluid under pressure from said control pipe, and means for preventing reduction of pressure in said control pipe by operation of said last means below a certain chosen pressure.

49. In a train braking system, in combination, a brake cylinder, a control valve device having a relay valve for controlling the supply of fluid under pressure to and its release from said brake cylinder and having a communication through which fluid under pressure is supplied to operate said relay valve, a source of fluid under pressure, electrically operated application and release valves for controlling supply of fluid under pressure from said source to said communication, control means for manually controlling operation of said application and release valves, electrically operated cut-off and release valve means operable to cut off communication between said relay valve and said source regardless of operation of said application and release valves and to release fluid under pressure from said relay valve to effect a release of fluid under pressure from said brake cylinder, and a retardation controller device operable at a chosen rate of retardation to effect operation of said cut-off and release valve means.

50. In a vehicle brake system, in combination, a brake cylinder, a brake valve device having a handle movable from a release position to various application positions and having contacts adapted to be operated upon movement of said handle to certain application positions, said brake valve device also having a valve adapted to establish a communication between a valve chamber and the atmosphere for one certain application position, means responsive to said operation of said contacts for effecting a supply of fluid under pressure to said brake cylinder, means responsive to establishing of said communication to the atmosphere by said valve for also effecting a supply of fluid under pressure to said brake cylinder, and means included in said brake valve device responsive to the supply by one of said last two means for actuating said contacts to lap position.

CLYDE C. FARMER.